US010462323B1

(12) United States Patent
Wurmfeld (10) Patent No.: US 10,462,323 B1
(45) Date of Patent: Oct. 29, 2019

(54) NON MECHANICAL OPTICAL BEAM STEERING MECHANISM FOR LASER PRINTERS

(71) Applicant: Capital One Services, LLC, McLean, VA (US)

(72) Inventor: David Wurmfeld, Fairfax, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/021,091

(22) Filed: Jun. 28, 2018

Related U.S. Application Data

(63) Continuation of application No. 16/015,912, filed on Jun. 22, 2018.

(51) Int. Cl.
| | |
|---|---|
| *B41J 2/44* | (2006.01) |
| *G02B 26/08* | (2006.01) |
| *G02B 26/10* | (2006.01) |
| *H04N 1/028* | (2006.01) |
| *G02B 27/30* | (2006.01) |
| *G02B 27/09* | (2006.01) |

(52) U.S. Cl.
CPC .......... *H04N 1/0282* (2013.01); *B41J 2/442* (2013.01); *G02B 26/0875* (2013.01); *G02B 26/10* (2013.01); *G02B 27/0977* (2013.01); *G02B 27/30* (2013.01)

(58) Field of Classification Search
CPC ...... G02F 1/295; G02F 1/0118; G02F 1/1326; G02F 1/1347; G02F 1/29; G02F 1/292; G02F 2001/133757
See application file for complete search history.

(56) References Cited

U.S. PATENT DOCUMENTS

| | | | | |
|---|---|---|---|---|
| 5,222,071 | A | * | 6/1993 | Pezeshki ............... B82Y 20/00 257/21 |
| 5,528,361 | A | * | 6/1996 | Sakata ............... H04N 1/00915 358/296 |
| 5,680,253 | A | * | 10/1997 | Hasegawa ............... G02B 5/32 359/18 |
| 6,449,084 | B1 | * | 9/2002 | Guo ....................... G02F 1/295 359/315 |
| 2005/0271325 | A1 | * | 12/2005 | Anderson ............... G02F 1/295 385/40 |
| 2015/0378242 | A1 | * | 12/2015 | Auxier .................. G02F 1/0118 385/8 |

* cited by examiner

*Primary Examiner* — John Zimmermann
(74) *Attorney, Agent, or Firm* — Finnegan, Henderson, Farabow, Garrett & Dunner LLP (57) ABSTRACT

A laser printing system includes a laser configured to produce a beam of light modulated according to image data input to the laser printing system, a photoreceptor drum including a photoconductive layer disposed along an outer peripheral surface of the photoreceptor drum, and a non-mechanical beam steerer configured for receiving the modulated light beam from the laser and steering the light beam in a scanning motion back and forth across the photoconductive layer of the photoreceptor drum. The laser printing system also includes a printer controller configured to structure the image data input to the laser printing system, and control an amount of electrical current flowing through portions of the non-mechanical beam steerer to change an effective index of refraction of the non-mechanical beam steerer and steer the modulated light beam in the scanning motion.

20 Claims, 4 Drawing Sheets

FIG. 4

NON MECHANICAL OPTICAL BEAM STEERING MECHANISM FOR LASER PRINTERS

CROSS-REFERENCE TO RELATED APPLICATIONS

This application is a continuation of U.S. patent application Ser. No. 16/015,912, filed Jun. 22, 2018. The content of the above-referenced application is expressly incorporated herein by reference in its entirety.

TECHNICAL FIELD

The disclosed embodiments relate generally to non-mechanical optical beam-steering mechanisms and, in particular, to non-mechanical optical beam-steering mechanisms for laser printers.

BACKGROUND

A conventional laser printing apparatus is configured to receive a stream of electronic data from a computing device and convert that data into an image on a recording medium, such as a piece of paper. The laser printer includes a laser that produces infrared wavelength light that is scanned back and forth across a photoreceptor drum with photoconductive material on the outer peripheral surface of the drum as the drum is rotated around a shaft. An electronic circuit in the printer determines how to print the data so that the information is presented properly on the paper. The electronic circuit of the laser printer activates a pre-charger, such as a corona wire or charged roller positioned adjacent to the rotating photoreceptor drum. The pre-charger donates static positive electrical charges developed by the corona wire, and the static electrical charges are discharged onto the photoconductive layer of the photoreceptor drum to create a positive charge spread uniformly across the surface of the drum. The electronic circuit of the laser printer also modulates the infrared wavelength light output from the laser in accordance with the stream of electronic data received by the laser printer. The beam of light produced by the laser is typically reflected off a rotary polygonal mirror driven in a back-and-forth manner by a motor to scan the reflected laser light beam across the photoconductive layer on the photoreceptor drum. The scanning laser light beam erases the positively pre-charged photoconductive layer in the areas exposed to the light, creating areas of negative charge on the photoconductive layer that correspond to the areas of an image that should receive black or other colors on the recording medium.

A developing means such as a toner-donating means donates positively charged toner particles on the photoconductive layer, and the areas of the photoconductive layer that have been exposed to the laser light beam are converted to negatively charged areas that attract and temporarily hold the positively charged toner particles. The recording medium, such as a sheet of paper, is then provided with a strong negative electrical charge, and passed adjacent to the photoreceptor drum. The negatively charged paper has a stronger negative charge than the negatively charged areas of the photoconductive layer, and hence attracts the positively charged toner particles away from the photoconductive layer on the photoreceptor drum and onto the surface of the sheet of paper to form the desired printed image on the paper.

Some of the disadvantages associated with using a rotating polygonal mirror to scan the laser light beam spot across the photoconductive layer on the photoreceptor drum include the noise associated with repeatedly rotating the mirror, and the wear and tear on the various control elements and moving parts associated with rotating the mirror. A non-mechanical method of scanning the light beam spot may alleviate these disadvantages.

The present disclosure is directed to overcoming one or more of the problems set forth above and/or other problems associated with conventional laser printing systems.

SUMMARY

Various exemplary embodiments of the disclosure provide systems and methods for scanning a light beam spot, created by a laser, along a photoconductive layer of a photoreceptor drum in a laser printer without the need for a mechanically controlled beam-steering mechanism. A beam steerer according to embodiments of this disclosure may be provided as a solid-state device configured to steer a laser beam across the photoreceptor drum at high speed without the need for mechanical moving parts.

According to one aspect of this disclosure, an exemplary embodiment may be directed to a laser printer including a laser configured to produce a beam of light modulated according to image data input to the laser printer. The laser printer may include a photoreceptor drum with a photoconductive layer disposed along an outer peripheral surface of the photoreceptor drum. The laser printer may also include a non-mechanical beam steerer configured for receiving the modulated light beam from the laser and steering the light beam in a scanning motion back and forth across the photoconductive layer of the photoreceptor drum.

According to another aspect of this disclosure, an exemplary embodiment may be directed to a non-mechanical optical beam steering mechanism for scanning a laser light beam of a laser printer across a photoconductive layer on a photoreceptor drum of the laser printer. The beam steering mechanism may include a solid state device including a waveguide core for guiding the laser light beam through the beam steering mechanism, at least one cladding layer on at least one side of the waveguide core, with a liquid crystal material disposed within the at least one cladding layer, and a substrate supporting the waveguide core and the at least one cladding layer, the substrate being made from at least one of silicon or an insulator.

According to yet another aspect of this disclosure, an exemplary embodiment may be directed to a laser printing system. The laser printing system may include a laser configured to produce a beam of light modulated according to image data input to the laser printing system. The laser printing system may also include a photoreceptor drum including a photoconductive layer disposed along an outer peripheral surface of the photoreceptor drum, a non-mechanical beam steerer configured for receiving the modulated light beam from the laser and steering the light beam in a scanning motion back and forth across the photoconductive layer of the photoreceptor drum, and a printer controller. The printer controller may be configured to structure the image data input to the laser printing system, including organize the image data into pages of information to be printed on recording medium by setting text margins, and arranging at least one of words or graphics, and process the image data using a raster image processor that takes at least a portion of the page data and breaks the data down into an array of dots. The printer controller may be further configured to feed the dots that make up the image data one horizontal line at a time to the laser, activate the laser to output a pulsed laser light beam to the non-mechanical beam steerer, with one pulse of light from the laser for every dot to be printed, and no pulse of light for every dot of empty space on each page of information, and control an amount of electrical current flowing through portions of the non-mechanical beam steerer to change an effective index of refraction of the non-mechanical beam steerer and steer the light beam in the scanning motion.

It is to be understood that both the foregoing general description and the following detailed description are exemplary and explanatory only and are not restrictive of the disclosed embodiments, as claimed.

The accompanying drawings, which are incorporated in and constitute a part of this specification, illustrate disclosed embodiments and, together with the description, serve to explain the disclosed embodiments.

DETAILED DESCRIPTION

Figure 1:
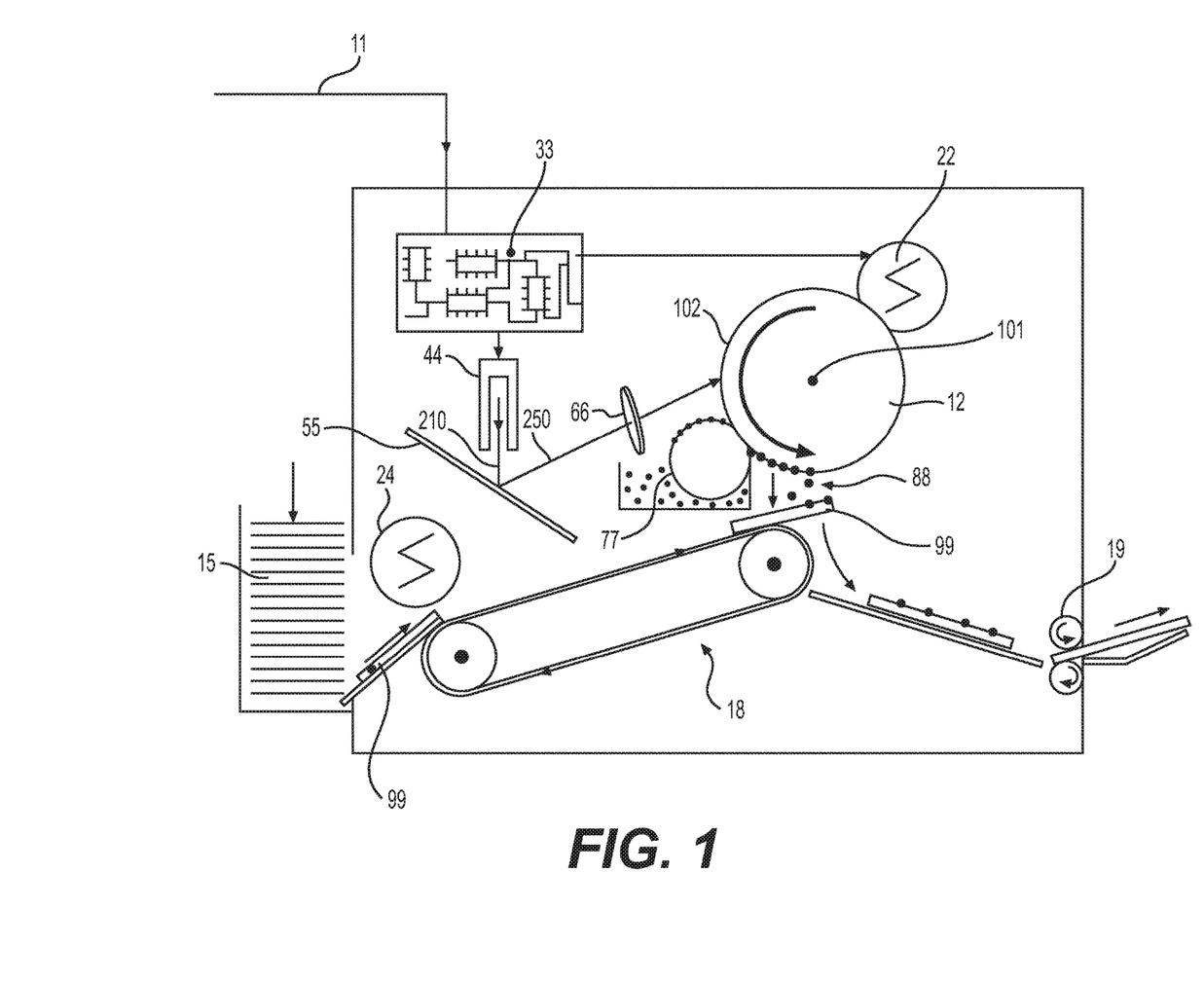
FIG. 1 is a schematic diagram illustrating an exemplary laser printing system.
Figure 2:
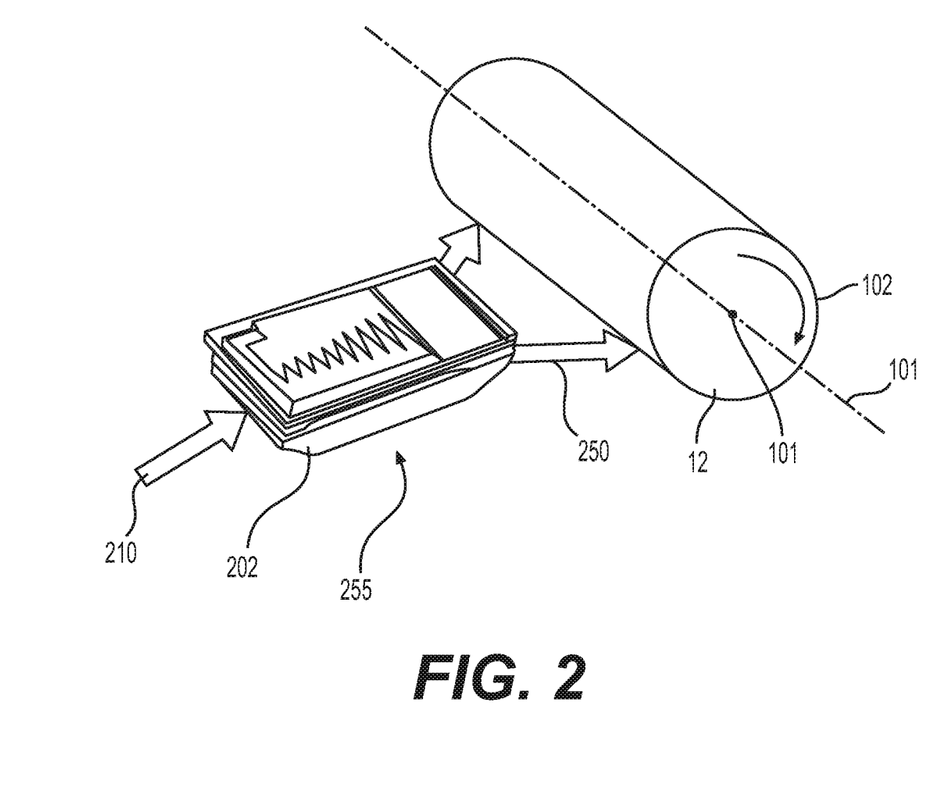
FIG. 2 is a schematic diagram of a non-mechanical, solid-state laser beam steerer consistent with an exemplary disclosed embodiment.
Figure 3:
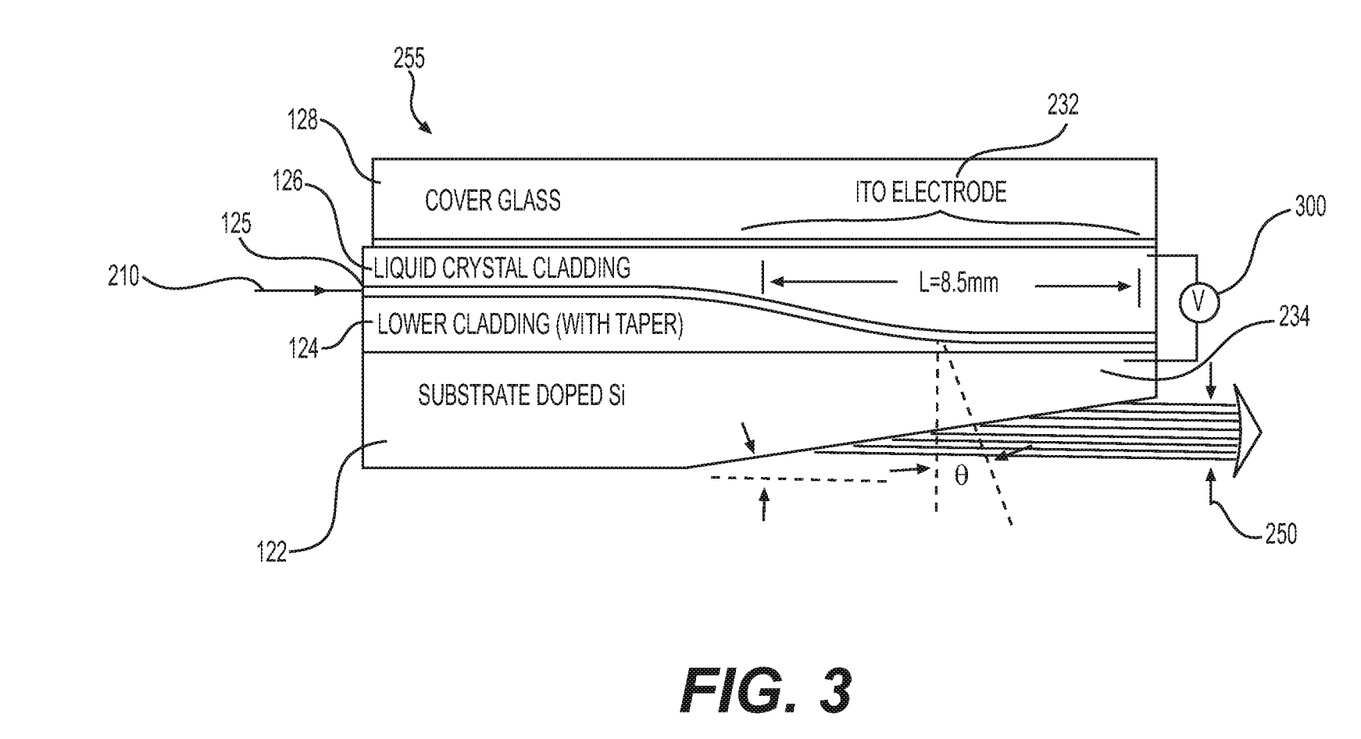
FIG. 3 is a cross-sectional side elevation view of the beam steerer shown in FIG. 2.
Figure 4:
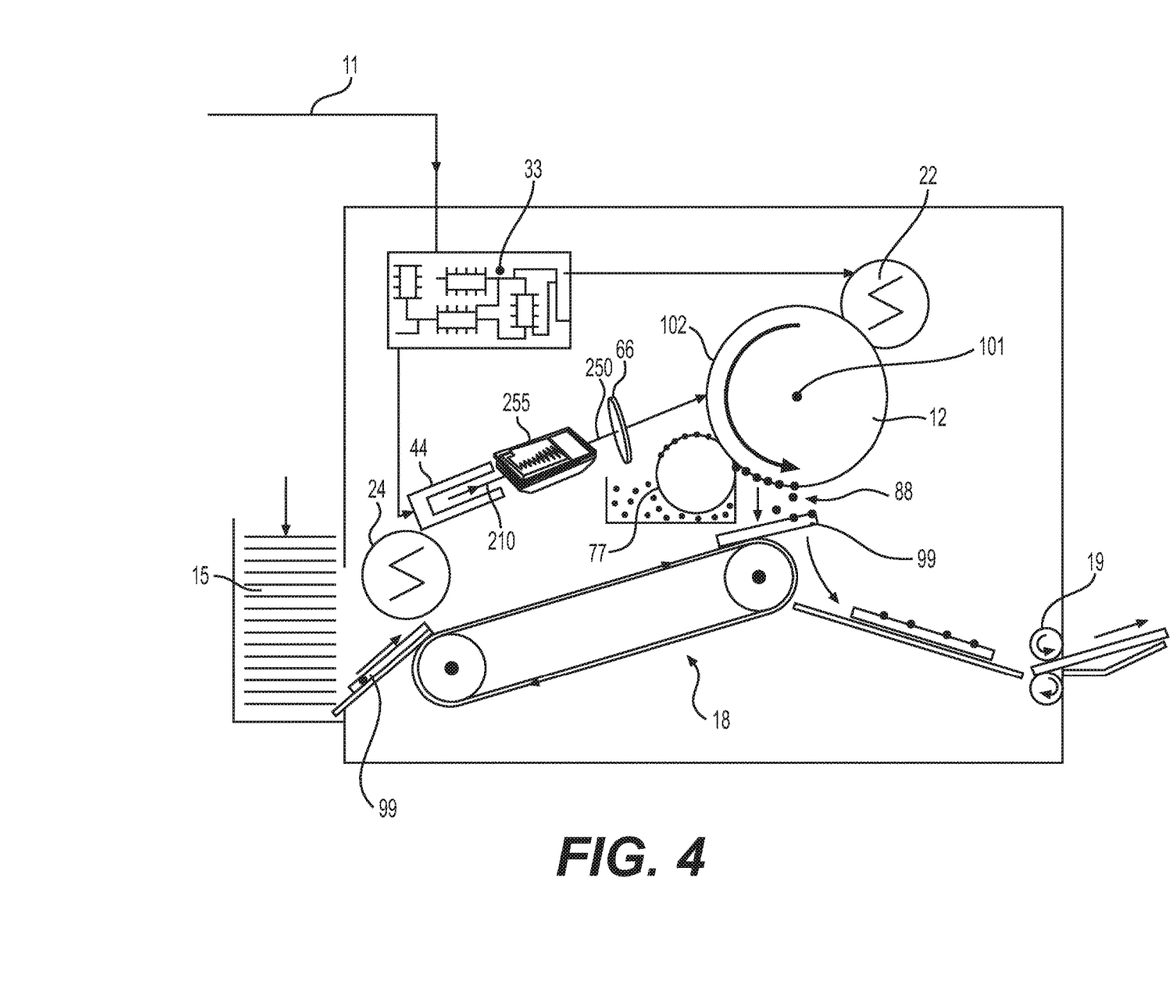
FIG. 4 is a schematic diagram illustrating an exemplary laser printing system including the beam steerer of FIGS. 2 and 3.

FIG. 1 is a schematic diagram showing a general structural configuration for a conventional laser printing apparatus. A laser 44 outputs a modulated light beam 210 that is typically reflected off a polygonal mirror 55 and focused onto a photoconductive layer 102 on the outer peripheral surface of a photoreceptor drum 12. Polygonal mirror 55 is moved by a motor and other control components to scan the laser output beam 210 back and forth across photoconductive layer 102 in a direction parallel to a central axis 101 of photoreceptor drum 12 as drum 12 is rotated. In various embodiments according to this disclosure, polygonal mirror 55 and all of the associated control components required to mechanically move the mirror may be replaced with a solid state beam steerer 255, as illustrated in FIGS. 2-4. Beam steerer 255 may be configured to include an optical waveguide with a controllable index of refraction. Beam steerer 255 may also be mounted in an orientation to receive laser output beam 210 from laser 44 and direct the laser beam in a scanning motion across photoreceptor drum 12.

The laser printing apparatus includes photoreceptor drum 12 rotatably driven around a shaft 101, and a pre-charger 22 for donating static electrical charges that are developed, for example, by a corona wire. Positively charged static electrical charges from pre-charger 22 may be discharged onto photoconductive layer 102 at the outer peripheral surface of photoreceptor drum 12, giving the photoconductive layer a uniform positive charge. The laser printing apparatus also includes electronic circuitry and associated software modules incorporated into a printer controller 33 that determines how to print incoming data 11 communicated to printer controller 33 from a host computing device. Printer controller 33 may activate pre-charger 22 and a semiconductor laser 44 capable of emanating modulated light. A collimator lens may be associated with laser 44 for focusing the modulated output light from laser 44 into a beam of light 210 with parallel rays. The collimated beam of light 210 may then be directed into beam steerer 255, as shown in FIG. 2.

A focusing lens 66 may be provided in between beam steerer 255 and photoreceptor drum 12 to focus the light beam onto photoconductive layer 102 of drum 12 and compensate for any distortions of the image data resulting from different distances between beam steerer 255 and points along the surface of drum 12. The light beam discharges selective areas of photoconductive layer 102, which have received a positive pre-charge from pre-charger 22, thus creating negatively charged areas on photoconductive layer 102 corresponding to a desired image. A developing means, e.g., a toner donating means 77 donates positively charged toner particles 88, which stick to the negatively charged areas on photoconductive layer 102. A sheet of paper 99 may be fed from a stack of paper 15 held in a paper tray, given a strong negative electrical charge by another corona wire 24, and carried by a continuous belt 18 or other paper transfer means to pass near photoreceptor drum 12. When each sheet of paper 99 passes by photoreceptor drum 12, the strong negative electrical charge on the sheet of paper attracts positively charged toner particles 88 away from the negatively charged areas of photoconductive layer 102 at photoreceptor drum 12 and onto the surface of sheet of paper 99. A mechanical toner cleaner and an optical de-charging lamp may also be provided for removing residual charge and excess toner from each printed recording sheet of paper 99. Each sheet of paper 99 is then passed through a fuser 19, which is a pair of heated rollers configured to melt the loose toner particles on the paper and fuse the toner with the fibers in the paper.

Printer controller 33 activates semiconductor laser 44 to emanate light modulated by a known measure of stop-and-feed laser current. The light passes through a collimator lens and into beam steerer 255, which then imparts a side-to-side scanning motion to the laser beam, as will be described in detail below. Printer controller 33 is configured to structure incoming data 11, and put each page of information together by setting text margins, arranging words and graphics, and then further process the data using, for example, a raster image processor that takes the page data, either as a whole or piece by piece, and breaks the data down into an array of tiny dots.

Laser 44 receives the page data in the form of signals that activate the laser to produce the tiny dots that make up the text and images—one horizontal line at a time. The scanning laser light beam leaving beam steerer 255 includes pulses of light from laser 44, with one pulse of light for every dot to be printed, and no pulse for every dot of empty space. The pulsed laser light beam then passes through focusing lens 66 or other means that compensate for image distortion caused by the varying distances between the output window of beam steerer 255 and points along photoreceptor drum 12. Output light beam 250 irradiates photoconductive layer 102 on the surface of photoreceptor drum 12 as the light beam scans back and forth across photoreceptor drum 12. Beam steerer 255 causes the light beam spot on photoconductive layer 102 to scan very fast widthwise of photoreceptor drum 12, as shown in FIG. 2, such that the direction of the sweeping of the light beam spot is substantially parallel to the axis 101 of photoreceptor drum 12. This widthwise scanning is referred to as main scanning, and a secondary scanning or sub-scanning is made by relative movement of photoreceptor drum 12 around its axis, or in a direction substantially orthogonal to the main scanning line of the light beam spot. The use of the term "substantially" refers to an amount that may deviate within standard machining and assembly tolerances that can be cost effectively achieved using known technologies.

At the exposure to the irradiation of light from laser 44, the positively pre-charged photoconductive layer 102 on photoreceptor drum 12 loses charge at the light-exposed parts, thus creating negatively charged areas in the form of a latent image on photoconductive layer 102 corresponding to areas that will receive toner on the recording medium. The latent image is then developed by toner donating means 77 (e.g., a magnetic brush), which touches photoreceptor drum 12 and coats it with tiny particles of toner that have been given a positive electrical charge so that they stick to the parts of photoconductive layer 102 at photoreceptor drum 12 that have a negative electrical charge after exposure to the scanning laser light beam. A positively charged latent image of a page to be printed thereby builds up on photoconductive layer 102 of photoreceptor drum 12, and is subsequently transferred to a sheet of paper 99 provided with a strong negative charge that is stronger than the negatively charged areas of photoconductive layer 102.

The laser printer according to various embodiments of this disclosure may include a semiconductor-based laser 44 configured to produce a beam of modulated light, a collimator lens configured to focus the beam of modulated light from the semiconductor laser into a collimated beam of light, a solid state, non-mechanical beam steerer that forms an optical waveguide with controllable index of refraction, and a photoreceptor drum including a photoconductive layer on the outer peripheral surface of the photoreceptor drum. The semiconductor-based laser in the laser printer may produce infrared wavelength light for the purpose of converting incoming image data 11 into a beam-steered optical signal that is moved in a horizontal scanning motion parallel to the central axis of a rotating photoreceptor drum to irradiate the positively pre-charged photoconductive layer on the drum and change the electrical charge to a negative charge on the portions of the photoconductive layer corresponding to a desired latent image.

FIGS. 2 and 3 illustrate an exemplary solid state, non-mechanical beam steerer 255. Beam steerer 255 may include liquid crystal material characterized by a property of deflecting a range of wavelengths of light passing along a face of the liquid crystal material as a result of changes to the refractive index of the liquid crystal material upon application of an electric voltage to, and current through, the face of the liquid crystal material. Beam steerer 255 forms an optical waveguide configured to allow for dynamic control of the index of refraction of the waveguide and hence the propagation speed of light passing through the waveguide. Beam steerer 255 may include a beam entrance window in a beam steerer housing 202 aligned with an optical waveguide core 125 or array of optical waveguide cores disposed along a substrate 122 formed from either a semiconductor material or an insulator. Other photonics components may be integrated in substrate 122 or provided as separate photonics devices. The beam entrance window may be configured for receiving a focused beam of collimated light 210. Beam steerer 255 may also include a beam exit window through which optically beam-formed light 250 exits beam steerer 255 in a scanning motion to be focused on photoconductive layer 102 of photoreceptor drum 12 of a laser printer.

Beam steerer 255 is a spatially inhomogeneous solid-state structure for guiding light—providing a spatial region in which light can propagate. Waveguide core or array of cores 125 in exemplary beam steerer 255 is formed as a region of controllable refractive index by providing liquid crystal materials disposed within beam steerer 255 in a cladding layer proximate or adjacent waveguide core 125. Waveguide core 125 may be made of materials such as dielectric materials with low absorptions whose index of refraction is greater than the index of refraction of an upper liquid crystal cladding layer 126 and greater than the index of refraction of a lower cladding layer 124. One or both of upper and lower cladding layers 126, 124 may be at least in part transparent to the wavelengths of light passing through waveguide core 125 in order to allow penetration of evanescent portions of the light. The evanescent portion of the light does not propagate, but instead decays in intensity over a subwavelength distance.

As shown in FIG. 3, waveguide core 125 is in the form of a channel or planar region located in between lower cladding layer 124 and upper liquid crystal cladding layer 126. In the exemplary embodiment illustrated in FIG. 3, lower cladding layer 124 happens to be provided with a tapered cross section in order to achieve desire optical refraction characteristics, although other configurations, for example without such a taper, are possible. Lower cladding layer 124 may be made of a dielectric material with low absorptions whose index of refraction is less than the index of refraction of waveguide core 125. Alternative configurations may include a liquid crystal material disposed within core 125 and/or within lower cladding layer 124. Beam steerer 255 also includes substrate 122, which may be a silicon substrate, an N-doped silicon substrate, or a P-doped silicon substrate, providing structural support and serving in part as a conductive layer, forming a lower electrode 234.

As shown in the exemplary embodiment of FIGS. 2 and 3, incoming beam of collimated light 210 propagates through optical waveguide core 125, passing by the liquid crystal material contained within liquid crystal cladding layer 126. The light may be moved in a scanning motion from side to side as a function of a modulated electric current flowing through the liquid crystal material of liquid crystal cladding layer 126. In the exemplary embodiment of FIG. 2, a modulated voltage 300 is applied between an upper electrode 232, which may be formed along a portion of upper liquid crystal cladding layer 126, e.g., as a layer of Indium-Tin-Oxide material (ITO), and lower electrode 234 formed along a portion of lower cladding layer 124 as a portion of substrate 122. The resulting change in potential across the upper and lower cladding layers 126, 124 on opposite sides of optical waveguide core 125 as voltage 300 is modulated results in changes in the current flowing through the liquid crystal material.

As light enters waveguide core 125 and propagates through the core along the length of the waveguide, the evanescent portions of the propagating light waves penetrate into transparent portions of one or both of the upper and lower cladding layers 126, 124. The changes in electrical current flowing through the liquid crystal material in upper liquid crystal cladding layer 126 result in changes to the refractive index of portions of the liquid crystal material. The changes in refractive index result in steering of the output beam of light 250 such that the beam may be scanned back and forth as it exits from waveguide core 125. Output light beam 250 is thereby moved in a scanning motion across a photoconductive layer on a photoreceptor drum of the laser printer in accordance with a modulated voltage 300 applied to beam steerer 255.

In various alternative embodiments, solid state photonics circuitry incorporated into beam steerer 255 may include an array of waveguides disposed in either a semiconductor or an insulator, and a means of phase-tuning the optical signals in the waveguides in order to steer the recombined beam. The phase steering mechanism can be thermo-optic, in which electrical heating elements incorporated near the waveguides of beam steerer 255 are used to change the optical phase of the signals, or electro-optic. In an electro-optic implementation an applied voltage is used to change the phase or absorption of the optical mode, or a diode or capacitor incorporated into the waveguide is used to alter the concentration of electrical charge interacting with the optical mode, thus altering the phase through the effect of plasma dispersion. In an electro-optic implementation such as shown in the exemplary embodiment of FIG. 2, a liquid crystal layer (which can specifically be liquid crystal-on-silicon (LCOS) when silicon photonics are used) is positioned adjacent to the optical waveguide core to selectively effect desired changes in refraction as light propagates through the waveguide, as discussed above.

When an array of optical waveguide cores are provided in beam steerer 255, the optical waveguide cores may have an adjacent insulating layer, where the insulating layer has an opening to expose the array of optical waveguide cores to a portion of liquid crystal cladding layer 126. The liquid crystal cladding layer can provide tuning for the array of waveguide cores by control of the application of voltage to the liquid crystal material. The voltage applied to the liquid crystal cladding layer can controlled by printer controller 33 and may separately tune all the waveguide cores. Applying different voltages to the liquid crystal cladding layer can create phase shifts to steer the output beam 250 of laser light as the light exits from the array of waveguide cores. In one exemplary embodiment, the opening in an insulating layer may expose more or less of different waveguide cores to portions of liquid crystal cladding layer 126 to produce a different phase shifting effect for each different waveguide core.

It will be understood that LCOS beamsteering is only one example of a possible semiconductor steering mechanism that can be used in a solid-state beam steerer as described herein. In various alternative embodiments, a beam steerer may include a thermo-optic phase array, or an electro-optic phase array. A thermo-optic phase array may include an array of waveguide cores with resistive heaters placed in proximity to the waveguide cores. Control logic implemented by printer controller 33 may apply a current to the resistive heaters to create more or less heat. Based on the change in temperature, the phase of signals in the waveguide cores will vary. Control over the heating can control the phase of the signals and steer the beam.

An electro-optic phase array may include an array of waveguide cores integrated with electrodes for application of either current or voltage to enable phase control via electro-optic deflection or modulation. Based on changing voltage or current levels, the material's electro-optical properties cause a change in transmission of an optical signal through the waveguide cores based on the changes to one or more applied voltages or currents. Thus, control of the voltage or current can control phase of the signals in the waveguide cores and steer the beam. Various alternative embodiments of the beam steerer can thus provide a steerable laser beam that is scanned across a photoconductive layer on a photoreceptor drum of a laser printer via electro-optical modulation, thermo-optical phase adjustment, liquid crystal beamsteering, or other beamsteering mechanism that can be integrated with a waveguide array and photonics components on a semi-conductor integrated circuit.

The use of solid-state photonics allows the integration of photonics components in a semiconductor substrate (e.g., silicon-based photonics in a silicon substrate, and/or III-V based photonics elements integrated with a silicon substrate). III-V compound semiconductors are obtained by combining group III elements (essentially Al, Ga, In) with group V elements (essentially N, P, As, Sb)—resulting in 12 possible combinations of materials (GaAs, InP, GaP, and GaN being the most important). The photonics components can include optical waveguides and combiners for routing light, passive elements that enable phased arrays for beam forming, one or more couplers to redirect light perpendicular to the photonics substrate, and can include lasers, modulators, and/or detectors. In one embodiment, the semiconductor photonics is silicon based, which allows the use of a standard silicon photonic transmitter wafer. In another embodiment, the silicon photonics processing incorporates III-V elements (e.g. Indium Phosphide—InP, or Gallium Arsenide—GaAs) integrated with the silicon for purposes of lasing, amplification, modulation, or detection. The standard silicon photonics processing may be extended to process liquid crystal materials onto the silicon photonics, such as liquid crystal cladding layer 126 in the exemplary embodiment illustrated in FIG. 2. The liquid crystal material enables a voltage-dependent change in the refractive index, which can enable both x and y beamsteering or beamforming. Other forms of integrated phase control could alternatively be used, such as thermo-optic phase control or electro-optic phase control.

The beam steering system for a laser printer according to various exemplary embodiments of this disclosure may include one or more laser sources, beam collimators, focusing lenses, and circuitry providing control signals for modulating the laser beam and controlling the scanning motion of output beam 250 from beam steerer 255. Signals for modulating and scanning output beam 250 may control aspects such as dot time, for generation of variations in individual pixels produced on a photoconductive layer of a photoreceptor drum in a laser printer, line retrace time, for control of the time it takes the beam to scan from one side of a page to the opposite side of the page, and page retrace time, for control of the time it takes to reset information for a successive page of information being printed.

In one embodiment, the use of photonics processing extended with an integrated phase control mechanism can enable the integration of all of the necessary beam modulation and steering circuitry on a single chip included within one of beam steerer 255 and/or printer controller 33, and compatible with wafer-scale manufacturing technologies. In some embodiments, the light source, such as a semiconductor laser or light emitting laser diode, could even be created on the same chip.

The solid-state beam steerer 255 enables the elimination of a typical rotating polygonal mirror used for scanning a laser beam across a photoconductive surface of a photoreceptor drum in conventional laser printers. This also enables elimination of the associated control components and moving mechanical parts for rotating the mirror, reducing vibrations and noise levels, reducing wear and tear on parts of the laser printer, and increasing efficiency, speed, and reliability. The solid-state beam steering system also can be manufactured at much lower cost than traditional mechanical beam steering systems for laser printers. Additionally, the use of semiconductor processing techniques allows the device to have lower power requirements and a much smaller form factor than available with conventional systems. Furthermore, solid-state beam steerer 255 does not require the environmentally-sealed packaging traditionally associated with mechanical optics such as rotating polygonal mirrors to avoid dust and humidity affecting optical components and clogging the mechanics of a mechanical beam steering system.

As shown in FIGS. 2-4, solid-state beam steerer 255 may be used in place of a typical mechanical, rotating polygonal mirror such as polygonal mirror 55 illustrated in FIG. 1. In the exemplary embodiment illustrated in FIGS. 2 and 3, which are not necessarily shown to scale, beam steerer 255 includes substrate 122, which may include at least a portion that is an N-doped or P-doped silicon substrate portion or other substrate portion doped with one or more impurities to affect the electrical properties of the substrate. Substrate 122 may include photonics or photonic circuit elements integrated into the substrate. In one exemplary embodiment, photonics may include an array of waveguide cores 125 to propagate light from input beam 210, received into housing 202 of beam steerer 255 through an input window formed on one side of housing 202, to an output window, such as an output slot formed along an opposite side of housing 202. A collimated beam of light 210 from a semiconductor laser 44 of the laser printer may be directed into the input window in housing 202 of beam steerer 255, and waveguide core 125 may propagate the light through beam steerer 255. As the light propagates through waveguide core 125 past liquid crystal cladding layer 126, a scanning motion is imparted to the light by modulating voltage 300 applied across upper and lower electrodes 232, 234, and thus current flowing through the liquid crystal material of liquid crystal cladding layer 126. Beam-steered light output 250 is thereby scanned from side to side across photoconductive layer 102 on photoreceptor drum 12 as photoreceptor drum 12 is rotated. In the case of a laser printer, the light output by semiconductor laser 44 typically has a wavelength that falls within the infrared spectrum, and the waveguide core or array of waveguide cores 125 in beam steerer 255 is specifically designed to convey electromagnetic radiation in the corresponding infrared wavelength(s).

In the exemplary embodiment of beam steerer 255 shown in FIG. 2, housing 202 may contain substrate 122, lower waveguide cladding layer 124, which may comprise a glass or ceramic material, waveguide core 125, upper waveguide liquid crystal cladding layer 126 of a liquid crystal material, and a cover glass layer 128, made of a material such as standard float glass, fused silica, or the like. Lower electrode 234 may be formed integral with or adjacent silicon substrate 122, and upper electrode 232 may comprise an Indium-Tin-Oxide (ITO) layer applied over a portion of upper liquid crystal cladding layer 126. Application of voltage 300 across upper and lower electrodes 232, 234 results in a change in the average index of refraction (i.e., the effective index of refraction) of upper liquid crystal cladding layer 126, core 125, and lower cladding layer 124. As the index of refraction of upper liquid crystal cladding layer 126 is tuned by changing the voltage 300, light traveling through waveguide core 125 skims along the lower surface of upper waveguide cladding layer 126 and interacts with the liquid crystal, in particular as evanescent portions of the light penetrate into transparent portions of the cladding layer. The voltage signal provided across electrodes 232, 234 may be modulated in order to cause beamsteered light output beam 250 to scan from side to side relative to input beam 210. The rate of scanning may be controlled to achieve desired dot time, line retrace time, and page retrace time as light output beam 250 is directed from side to side across photoconductive layer 102 on photoreceptor drum 12 of a laser printer.

Thus, beam steerer 255 with a controllable refractive index can steer the light beam by changing the application of a voltage applied across liquid crystal cladding layer 126, which can in turn change the phase effects that occur in each waveguide path. Beam steerer 255 can steer the light beam without the use of mechanical parts, and thereby avoid many of the disadvantages associated with mechanical beam steering mechanisms such as rotating polygonal mirrors, as discussed above.

The elements in the following claims are to be interpreted broadly based on the language employed in the claims and not limited to examples described in the present specification or during the prosecution of the application, which examples are to be construed as non-exclusive. It is intended, therefore, that the specification and examples be considered as example only, with a true scope and spirit being indicated by the following claims and their full scope of equivalents.

What is claimed is:

1. A method of laser printing, comprising:
   receiving image data from a computing device at a laser printer controller;
   activating a laser using the printer controller in accordance with the received image data to produce a modulated laser light beam;
   receiving the laser light beam into an array of waveguide cores of an optical waveguide having a controllable index of refraction, wherein an insulating layer is provided adjacent the array of waveguide cores with one or more openings through the insulating layer configured to expose different amounts of different waveguide cores of the array of waveguide cores to portions of a liquid crystal cladding layer;
   controlling a voltage applied to the liquid crystal cladding layer to separately tune all of the waveguide cores and produce a different phase shifting effect for each different waveguide core by selectively changing an effective index of refraction of the liquid crystal cladding layer, thereby causing the laser light beam to exit the waveguide in a scanning motion; and
   directing the scanning laser light beam across a photoconductive layer on a rotating photoreceptor drum in a direction parallel to a central axis of the drum.

2. The method of claim 1, further comprising:
   organizing the image data, using the printer controller, into pages of information to be printed on recording medium by setting text margins, and arranging words and graphics;
   processing the image data using a raster image processor by taking at least a portion of the page data and breaking the data down into an array of dots;
   feeding the dots one horizontal line at a time to the laser; and
   activating the laser to output a pulsed light beam to the optical waveguide, with one pulse of light from the laser for every dot to be printed.

3. The method of claim 1, wherein controlling the voltage includes applying the voltage to electrodes on opposite sides of the liquid crystal cladding layer, the liquid crystal cladding layer having a liquid crystal material disposed therewithin.

4. The method of claim 3, wherein controlling the voltage comprises applying the voltage to an Indium-Tin-Oxide electrode formed along a surface of the liquid crystal cladding layer, and along an electrode formed in a substrate, the substrate supporting the array of waveguide cores and the liquid crystal cladding layer.

5. The method of claim 1, further comprising:
activating a pre-charger, using the printer controller, to impart a positive static electrical charge uniformly across the photoconductive layer of the drum before directing the scanning laser light beam across the photoconductive layer.

6. The method of claim 5, wherein directing the laser light beam includes activating the laser, using the printer controller, to produce pulses of light to discharge selected portions of the positively charged photoconductive layer corresponding to the image data.

7. The method of claim 1, further comprising:
focusing the modulated light beam with a collimator lens before receiving the modulated laser light beam into the waveguide cores; and
focusing the laser light beam exiting the optical waveguide to compensate for distortions of the image data resulting from different distances between the waveguide and points along the photoconductive layer on the drum.

8. The method of claim 1, further comprising:
activating a pre-charger, using the printer controller, to impart a positive static electrical charge uniformly across the photoconductive surface before directing the scanning laser light beam across the photoconductive layer;
activating the laser, using the printer controller, to produce pulses of light to discharge selected portions of the positively charged photoconductive surface corresponding to the image data;
developing a latent image corresponding to the image data on the photoconductive surface by introducing positively charged toner particles to the photoconductive surface; and
passing a recording medium having a strong negative static electrical charge in proximity to the photoconductive surface such that the positively charged toner particles are transferred to the recording medium from the photoconductive surface to form an image corresponding to the image data.

9. A method for scanning a modulated laser light beam output by a laser of a laser printer across a photoconductive surface of a photoreceptor drum, the method comprising:
receiving the modulated laser light beam into an array of waveguide cores of an optical waveguide with a controllable index of refraction, wherein an insulating layer is provided adjacent the array of waveguide cores with one or more openings through the insulating layer configured to expose different amounts of different waveguide cores of the array of waveguide cores to portions of a liquid crystal cladding layer; and
controlling a voltage applied to the liquid crystal cladding layer to separately tune all of the waveguide cores and produce a different phase shifting effect for each different waveguide core by selectively changing an effective index of refraction for the laser light beam propagating through the array of waveguide cores, thereby causing the laser light beam to exit the waveguide in a scanning motion.

10. The method according to claim 9, wherein controlling the voltage applied to the liquid crystal cladding layer includes applying the voltage to electrodes on opposite sides of the liquid crystal cladding layer, the liquid crystal cladding layer having a liquid crystal material disposed therewithin.

11. The method according to claim 10, wherein controlling the voltage comprises applying the voltage to an Indium-Tin-Oxide electrode formed along a surface of the liquid crystal cladding layer, and along an electrode formed in a substrate supporting the array of waveguide cores and the liquid crystal cladding layer.

12. The method according to claim 9, wherein applying the voltage to the liquid crystal cladding layer comprises controlling, by a printer controller, variations in individual pixels produced on the photoconductive layer.

13. The method according to claim 9, wherein controlling the voltage comprises controlling, by a printer controller, variations in line retrace time or the time it takes the laser light beam to scan from one side of a page to the opposite side of the page.

14. The method according to claim 9, wherein the voltage applied to the optical waveguide is controlled by a printer controller to control variations in page retrace time or the time it takes to reset information for a successive page of information being printed.

15. The method according to claim 9, further comprising directing the modulated laser light beam output by the laser through a collimating lens before receiving the modulated laser light beam into the array of waveguide cores.

16. The method according to claim 9, further comprising directing the laser light beam exiting the waveguide in a scanning motion through a focusing lens before contacting the photoconductive surface of the photoreceptor drum.

17. A method of operating a laser printer, comprising:
receiving a modulated laser light beam from a laser diode into an array of waveguide cores of an optical waveguide having a controllable index of refraction, wherein an insulating layer is provided adjacent the array of waveguide cores with one or more openings through the insulating layer configured to expose different amounts of different waveguide cores of the array of waveguide cores to portions of a liquid crystal cladding layer;
controlling a voltage applied to the liquid crystal cladding layer, using a printer controller, to separately tune all of the waveguide cores and produce a different phase shifting effect for each different waveguide core by selectively changing an effective index of refraction of the array of waveguide cores, thereby causing the laser light beam to exit the waveguide in a scanning motion; and
directing the scanning laser light beam across a photoconductive layer on a rotating photoreceptor drum.

18. The method according to claim 17, wherein controlling the voltage includes applying the voltage across a liquid crystal material contained within the liquid crystal cladding layer disposed along at least one of opposite sides of the array of waveguide cores.

19. The method of claim 18, wherein controlling the voltage comprises applying the voltage to an Indium-Tin-Oxide electrode formed along a surface of the liquid crystal cladding layer, and along an electrode formed in a silicon substrate, the substrate supporting the array of waveguide cores and the liquid crystal cladding layer.

20. The method of claim 17, further comprising:
activating a pre-charger, using the printer controller, to impart a positive static electrical charge uniformly across the photoconductive layer before directing the scanning laser light beam across the photoconductive layer;
activating the laser, using the printer controller, to produce pulses of light to discharge selected portions of the positively charged photoconductive layer corresponding to image data received by the printer controller;

developing a latent image corresponding to the image data on the photoconductive layer by introducing positively charged toner particles to the photoconductive layer; and passing a recording medium having a negative static electrical charge in proximity to the photoconductive layer such that the positively charged toner particles are transferred to the recording medium from the photoconductive layer to form an image corresponding to the image data.

* * * * *